United States Patent [19]

Pryor

[11] Patent Number: 4,667,231

[45] Date of Patent: May 19, 1987

[54] ELECTRO-OPTICAL PART INSPECTION IN THE PRESENCE OF CONTAMINATION AND SURFACE FINISH VARIATION

[75] Inventor: Timothy R. Pryor, Windsor, Canada

[73] Assignee: Diffracto Ltd., Windsor, Canada

[21] Appl. No.: 330,826

[22] Filed: Dec. 15, 1981

Related U.S. Application Data

[63] Continuation-in-part of Ser. No. 525,801, Aug. 29, 1983, abandoned, which is a continuation of Ser. No. 269,614, Jun. 2, 1981, Pat. No. 4,576,482, which is a continuation of Ser. No. 203,866, Nov. 4, 1980, abandoned, which is a continuation of Ser. No. 73,226, Sep. 7, 1979, abandoned.

[51] Int. Cl.[4] ............................................. H04N 7/00
[52] U.S. Cl. .................................... 358/107; 358/101; 358/901; 356/237
[58] Field of Search ............... 358/107, 106, 101, 901; 382/50; 356/73.1, 338, 430, 431, 237, 239

[56] References Cited

U.S. PATENT DOCUMENTS

| | | | |
|---|---|---|---|
| 3,604,940 | 12/1971 | Matthews | 356/159 |
| 3,947,129 | 3/1976 | Wiklund | 356/159 |
| 4,117,539 | 9/1978 | Bell et al. | 364/551 |
| 4,160,263 | 8/1979 | Christz et al. | 358/107 |
| 4,394,683 | 7/1983 | Liptay-Wagner | 358/106 |

Primary Examiner—Edward L. Coles, Sr.
Attorney, Agent, or Firm—Larson and Taylor

[57] ABSTRACT

A method and apparatus are provided for sensing the location of a surface of an object in the presence of localized surface contamination, roughness or other minor irregularities. A light image of pattern is imaged onto a photodetector corresponding to each of a plurality of points or zones on the surface of an object illuminated with light so that the photodetector produces an electrical output signal related to the relative location of the individual points or zones. Values represented by the electrical signals are then averaged and the results used in determining the location of the surface. Values falling outside of a preselected threshold or thresholds can be discarded in evaluating the results, in lieu of, or prior to, averaging.

62 Claims, 18 Drawing Figures

ELECTRO-OPTICAL PART INSPECTION IN THE PRESENCE OF CONTAMINATION AND SURFACE FINISH VARIATION

BACKGROUND OF THE INVENTION

This application is a continuation in part of U.S. Ser. No. 073,226 filed 9/7/79 now abandoned and continued as Ser. No. 269,614, filed 6/02/81 now U.S. Pat. No. 4,576,482 entitled "Electro-optical Inspection" and Ser. No. 203,866 filed 11/4/80 now abandoned and continued as Ser. No. 525,801, filed 8/29/83, now pending entitled "High Speed Electro-optical Inspection" by the inventor. In the former, method and apparatus were shown for the inspection of parts of considerable interest to the automotive and related fields such as camshafts, crankshafts, valves etc. In that application, the problem of dirt on the parts was discussed and at least one technique using a cylindrical lens to average over more surface area was disclosed (which allows small dirt spots, nicks, etc. to be averaged out).

Referenced application Ser. No. 203,866 discusses means for high speed cylindrical part measurement and in particular, there are means shown in FIG. 6 for dealing with the dirt etc. on the surface.

SUMMARY OF THE INVENTION

This application expands on the concepts of the two copending referenced applications above and provides further method and apparatus for providing reliable inspection on parts which may have some dirt, wash marks, nicks, etc. on them. Also, the instant invention provides methods of inspecting parts coming out of grinders and other machines with coolant on them for the purposes of high resolution, dimensional measurement, microfinish inspection and defect detection.

Also disclosed are means for assuring that the sensor windows stay clean, as well as further preferred means for constructing the sensor packages of the previous invention.

While this application is primarily directed at the problems of inspecting cylindrical parts, it is clear that many of the concepts and apparatus disclosed can be useful when practicing triangulation or defect detection, for example, according to the following co-pending applications incorporated herein by reference:

1. Electro-optical sensor systems for thread and hole inspection Ser. No. 64,867, filed 8/08/79, now U.S. Pat. No. 4,315,688
2. Method and apparatus electro-optically determining the dimension attitude and location of objects: Ser. No. 34,278, filed 4/30/79 now U.S. Pat. No. 4,373,804
3. Method and apparatus for determining physical characteristics of object and object surfaces: Ser. No. 15,792, filed 2/27/79 now U.S. Pat. No. 4,305,661.
4. New photodetector array based optical measurement systems: Ser. No. 163,290 filed 6/26/80, now U.S. Pat. No. 4,394,683
5. Electro-optical inspection, Ser. No. 073,226, filed 9/07/79, now abandoned.
6. Co-ordinate measuring method and device, Ser. No. 201,081 filed 10/27/80, now abandoned.
7. Electro-optical sensors with fiber optic bundles, Ser. No. 173,370 filed 7/29/80, now U.S. Pat. No. 4,441,817.
8. Electro-optical surface roughness measurement and control Ser. No. 240,459 filed 3/04/81, now abandoned.
9. Apparatus for determining dimensions, Ser. No. 134,465, filed 3/27/80 now U.S. Pat. No. 4,403,860.
10. High speed electro-optical inspection, Ser. No. 203,866, filed 11/04/80 now abandoned.
11. Fiber optic based robot controls, Ser. No. 200,401, filed 10/24/80 now U.S. Pat. No. 4,460,826.
12. Electro-optical sensors for machine tool and robotic inspection.
13. Electro-optical systems for control of robots, manipulator arms and coordinate measurement machines
14. Method and apparatus for determining wear or breakage of tools and other defects
15. Electro-optical systems for detection of leakage and blockage
16. Productivity improvement via robotic electro-optical part and tool inspection
17. Robot tractors
18. Method and apparatus for determining physical characteristics of object outer surfaces Ser. No. 15,614 filed 2/27/79 now U.S. Pat. No. 4,326,808
19. Method and apparatus for determining dimensional information concerning an object (division of Ser. No. 15,792)
20. Method and apparatus for detection of surface deformaties (division of Ser. No. 15,792) Ser. No. 234,728 filed 2/17/81 now abandoned.
21. "Linear" continuation of Ser. No. 015,792
22. "Circular" continuation of Ser. No. 015,792
23. Optically controlled plumbing apparatus Ser. No. 29, 840, filed 4-13-79 now abandoned.
24. Optically controlled bathing systems
25. Electro-optical and robotic casting quality assurance
26. Controlled machining of combustion chambers, gears and other surfaces including methods for obtaining correct combustion chamber volume in finished engine assemblies.

The invention herein will become clear on consideration of the following embodiments:

DESCRIPTION OF THE PREFERRED EMBODIMENTS

Figures 1, 1A, 1B:
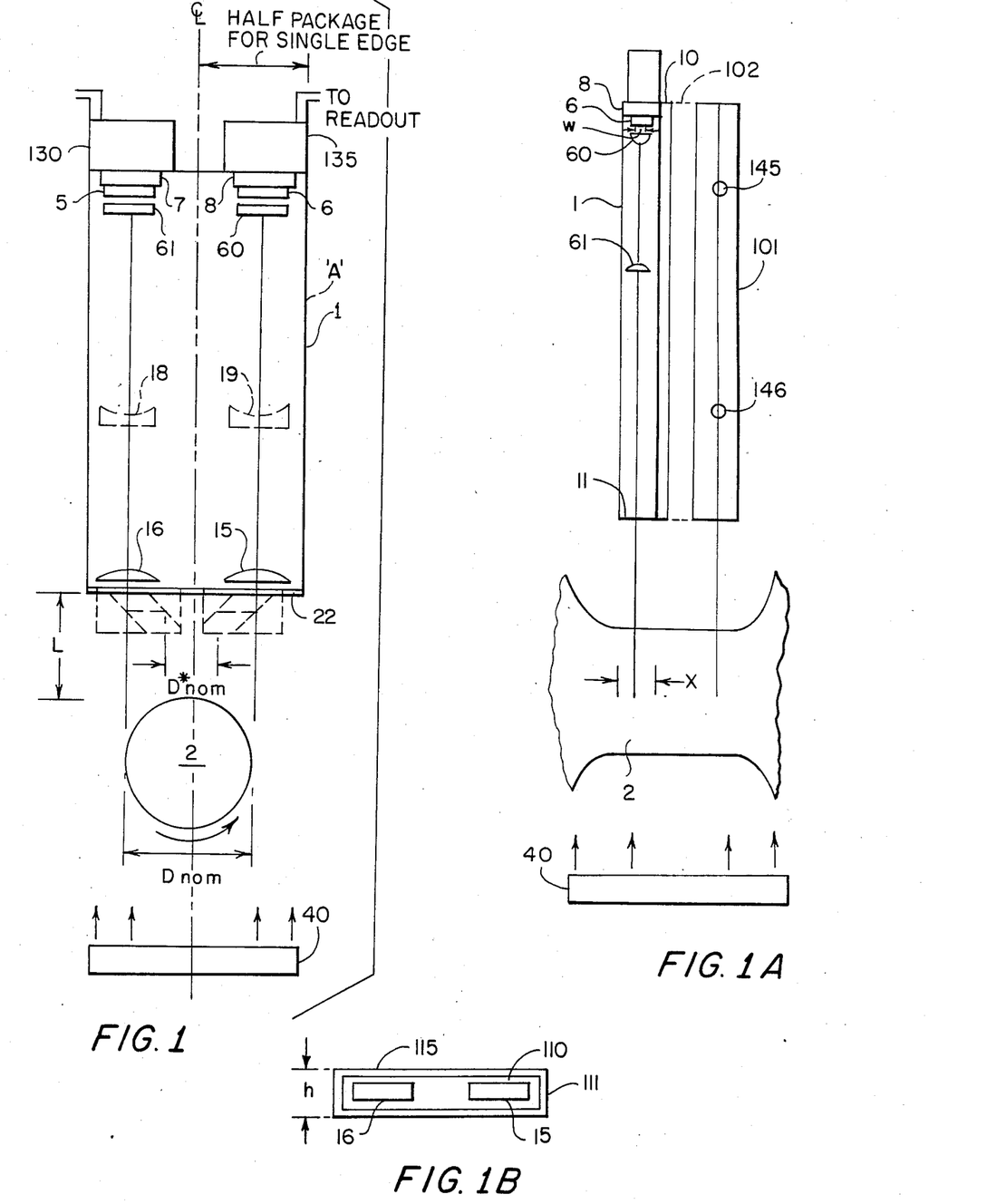
FIGS. 1, 1A and 1B illustrate a crankshaft journal measuring embodiment of the invention.

FIG. 1 illustrates a crankshaft journal measurement application according to the invention of the referenced parent application (Ser. No. 073,226). A dual detector array sensor 1 is used to see the diameter of journal 2. Photo detector arrays 5 and 6 are in sockets 7 and 8, rigidly mounted on a common metal (usually steel) plate 10, together with two lenses, 15 and 16, one for each array.

In practicing this invention, there are several important details which are required for reliable operation in industrial plants with typical production parts.

One very important aspect was discussed in the previous Ser. No. 073,226 application, namely the importance of looking at a long enough length, X, of the part edge in order to average out variations in the part surface or contaminants on the part. In the application here disclosed, this is done in two ways: first, using low magnification and a wide diode array, and second using a narrow diode array and cylinder lens optics. This particular figure seeks to illustrate several different cylindrical arrangements and explain their use beyond that described in the referenced copending applications.

For example, in FIG. 1, if a 2:1 lens magnification is used, such very desirable averaging is provided by utilizing wide diode arrays 6 or 7, eg. Reticon 256C of width w=0.017 inches. This provides a 0.0085″=X. In the crankshaft application, however, a 5:1 magnification is desired, for maximum resolution and in this case, it is preferred to use a cylinder lens 60 or 61, typically of 3 mm focal length located in front of a much less expensive Reticon 256G arrays 6 and 7 of width w=0.001 inches. In each case, the width of zone on the part X viewed by the array is in the range of 0.008-0.020 inches, a range which has proved very desirable in practice. Larger zones X can also be used, as described in Ser. No. 203,866. However, smaller zones, such as 0.002″ or less are sure to cause trouble as they are in the order of the surface irregularities and contamination and provide little or no averaging of said irregularities, dirt, etc.

Cylinder lens 60 in many cases is preferably attached via transparent cement to the array front window. This provides a good alignment and eliminates surface reflections at the interface.

FIG. 1 also illustrates the use of an optional multi-lens system, for example, optionally utilizing negative lenses 18 and 19 (dotted lines). This allows 5:1 magnification for example in a reasonable package while still attaining 4″-10″ standoff distances, L, which are very desirable. This is because part transfer is often 2″ and one needs to clear other portions of the part, allowing jams to be cleaned, etc. Window 22, is also desirable to seal the housing, and protect the lens(es).

In FIG. 1, an alternative cylinder lens can be used, such as 61 rather than (or in addition to), 60, whose focal length or position can be varied to suit the application to collect up to ¼″ long of the part surface onto the diode array as shown.

For illustration, the lighting of the part in FIG. 1 is shown provided by a long and diffuse light source, 40. Alternately quasi-parallel light as from a collimated light source, laser, etc. can be used. The choice of cylinder lens location and focal length is somewhat dependent on light source choice, however, it has been found in practice that the short focal length lens like (fl in the range 2 mm-6 mm) 60 right at the array is most useful.

Figure 8:
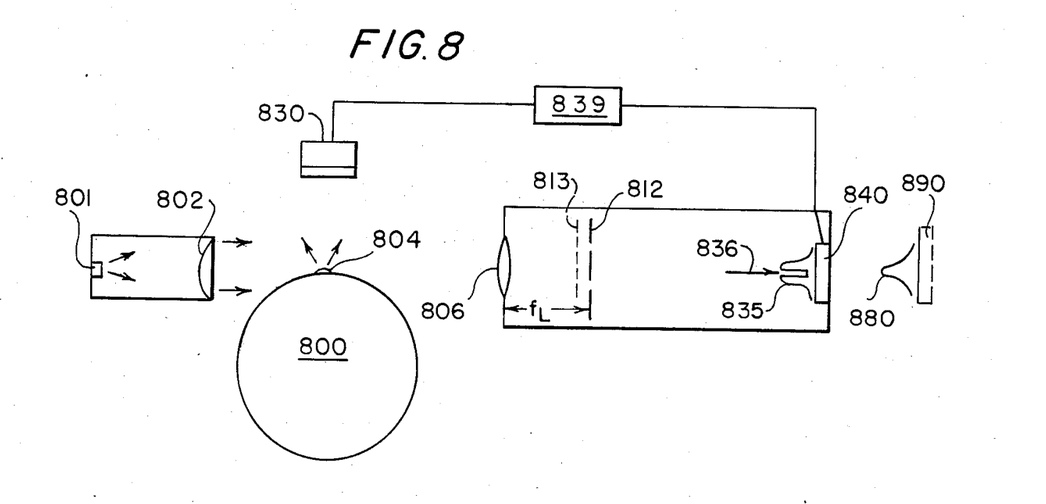
FIG. 8 illustrates another embodiment of the invention.

It is also noted that the cylinder/spherical lens arrangement of FIG. 1 can, to a degree, be duplicated by dual cylinder lenses such as 201 and 202 imaging object 206 onto detector 210 in FIG. 8. Because of difficulty with correction of cylinder optics, this is best done with monochromatic sources such as diode laser 203 collimated by lens 204. In this example, a TV camera photodetector is utilized, however, photodetector arrays are preferred.

Similarly, a cylindrical mirror such as 250 (FIG. 3B) can be used in combination with a cylindrical or spherical lens 251 to image part edges 256 onto photodiode array 257. This eliminates chromatic error and makes a compressed package, 260. As on many packages, an easy to clean sensor window 261 is utilized, with all internal parts within a sealed housing (260).

In summation, using the means described above, it is possible to have light from a wide range of widths X in the length direction of the part incident upon the array such that small pieces of dirt typically 1 or 2 thousandths of an inch wide or tiny surface roughness or irregularities of the part are averaged out. In addition, as was pointed out in the referenced co-pending applications, the cylinder lens (or wider array) acts to greatly increase the amount of light available at the array. This allows much faster scan rates or, conversely, less powerful light sources to be used.

It is interesting to note that an engine valve gage was first built along the lines of the first referenced application (FIG. 8) without following these principles, utilizing the raw array width (0.001″) and 5:1 magnification. (resulting in x=0.0002″) The light sources utilized had to be so powerful (at the necessary scan rate required by the part rotation rate demanded by the application), that they required huge cooling fans and even then would burn the hands of the people touching the machine. In addition to all of this, errors were found due to the randomness of dirt and surface finish on the part and the required accuracy (50 millionths of an inch) of the gage was never achieved until steps such as disclosed here were taken. In one stroke, the addition of cylinder lenses, in this case, just as shown in FIG. 1, solved both problems. With a cylinder lens focal length of 3 mm, X was raised to approximately 0.010″.

Clearly, if one can afford wider diode arrays which are almost invariably more expensive than narrower ones, the use of the cylindrical optics becomes less required. However, the cost difference at this writing is substantial (5:1) and often represents the difference between affordability or not of the gage. For example, a crankshaft gage according to the invention is being constructed with 55 such arrays, and a $550 price difference between Reticon 256 G and C type arrays equates to almost $30,000. Even if the 256C's were used, at 5:1 magnification it still would only see X=0.003″ of the part surface unless cylinder optics were used.

Another object of this invention is to provide further means for averaging out the effects of dirt, and other contaminants on the part, as well as part microfinish itself. Typically, such cylindrical parts such as cams, valves, cranks, roller bearings and other parts are rotated to effect the measurement. When this is done, the chance also exists to average out and/or throw inaccurate data encountered during rotation. This is disclosed in three manners:

(a) Averaging:

One technique is to average all diameter or radius data over the entire 360° of rotation to arrive at the nominal part diameter. Alternatively, and/or additionally this averaging can be performed over a portion of the part rotation, for example 5°, 10° or 15°.

This averaging can be done electronically or via program in a readout microcomputer such as 50. However, averaging can also be performed by simply running the array(s) at a slower scan rate, thereby automatically and optically integrating the surface effects over the angular movement occuring during the scan.

Alternatively, a preferred method to optically average is to control the integration time of the array to integrate the optical energy detected over say, a scan interval representing 10° of scan, and then make the array scan very quickly. This gives the most desirable representation of the part surface location since all elements of the array have seen the same angular portions of the part within the scan interval. (This is not quite the case if the scan rate is just slowed down.) FIG. 2B illustrates this case.

It is noted that slower scan rates or longer integration times give better light power utilization, allowing smaller sources to be used than at high scan rates. It is further noted that one could average over longer intervals than 5° or 10° optically, but 2 problems ensue. First one is deprived of runnout data on the part of concentricity or other measurement purposes. Secondly, most diode arrays can't integrate beyond 0.1 sec. which provides an upper limit to the integration time, and thence angular interval if rotation rate is fixed by mechanical constraints.

(b) Elimination of Outliers:

Another means of dealing with the dirt problem is to take data from substantially all rotational positions on the part 360° and throw out the outlying data. This is more generally done digitally via program in the microcomputer but can be done by hard wired circuits, analog or other means as well. In one case, readings from the part every 5° are taken in groups, to form a group of 6 readings (eg. every 30°), the average calculated, and any outlying values discarded. The average of all 30° group readings thus processed then gives average diameter, with outliers removed.

(c) Elimination of Positive Going Outliers:

A further form of processing can be done by simply realizing that most 'large' irregularities on the part surface that are caused by dirt (or other contamination, for example, coolant droplets or wash mark blobs of detergent from a part washer) cause large positive increases in either the radius or the diameter of the part. Diameter changes are unambiguous, so are radius changes if the part is well constrained (eg. in vees or centers) during rotation. If such an increase exists over for let's say 30°, 10° or even less of rotation, it is likely that it is a blob of dirt, coolant, or water from a washer.

In this case, such large positive signals can be ignored via suitable programs in the microcomputer or hardware circuits.

It is of interest to note that the 'large' protrusions from the part surface may be only 0.001" high (25 μm). This, however, is large when one is looking for resolution of wrist pin diameters, for example, to 20 millionths of an inch and total part tolerance is only 0.0005" (12 μm).

Translation:

It should be noted that the above steps can also be used to advantage as when the sensor is translated rather than rotated relative to the part in question. The same comments relative to scan integration time filtering and averaging apply here as well. This is discussed further relative to FIG. 5. Such electronic averaging in the axial direction of a part can be in addition to, or instead of, averaging as described above using cylinder lenses and the like.

Figure 2A:
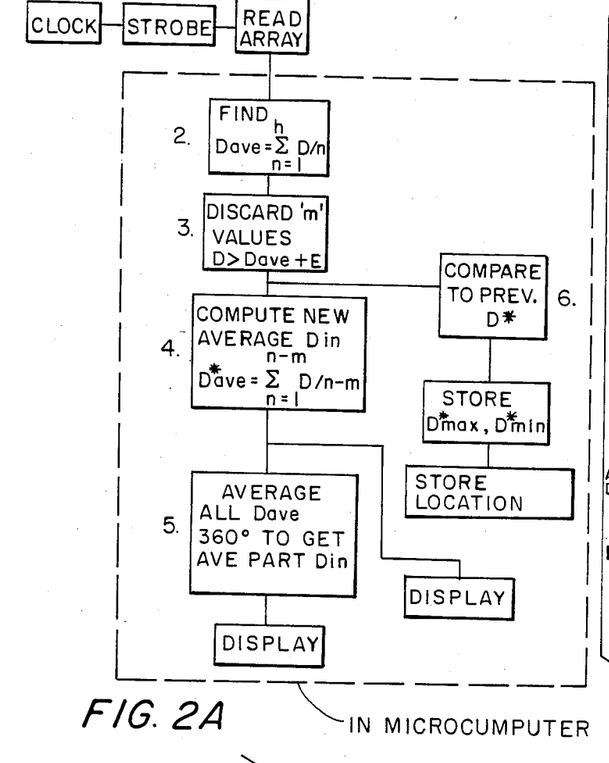
FIGS. 2A-B illustrate data processing according to the invention, suitable for rotation or translation of the sensor relative to the object to be measured.
Figure 2B:
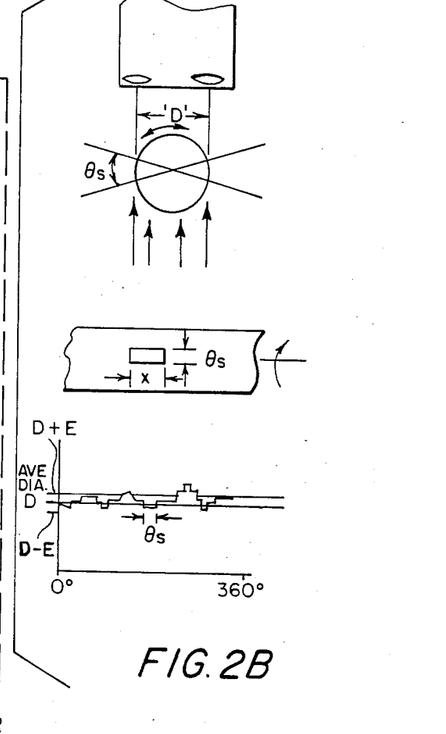

FIG. 2 illustrates certain processing steps via a block diagram of data referenced in FIG. 2B. As shown, data is taken from the diode array at a frequency of one scan every 0.01 seconds, for example, on the engine valve. At a rotational speed of 300 msec. per revolution, this corresponds to 1/30 of the circumference of the valve or about $\theta s = 10°$ per scan. The clock that drives this scan is generally programmable via the microcomputer and can be changed to allow larger or smaller circumferential integrations of the surface data to be performed.

The data is read into the microcomputer and the average of n scans taken (block 2). In one processing example, any data not lying within a band $\pm \epsilon$ from the average of this data is discarded and the remaining data reaveraged. In another more sophisticated example, a best straight line fit is done by normal techniques well known in the art. In a third example, illustrated in blocks 3 and 4, only positive going values greater than $D_{AVE} + \epsilon$ are discarded. The remaining data then constitutes the average location of the part at a mean rotational position bisecting the group location shown in FIG. 2b, with positive going (i.e. increasing radius or diameter) blobs removed.

A third processing step (block 5) is utilized to sum up the average of the individual group averages to obtain the average diameter of the part. A fourth processing step, block 6, compares the maximum and minimum of the group averages to obtain the maximum and minimum diameter of the part. A location at which the maximum and minimum occurs is further stored in order that future concentricity comparisons can be made.

Clearly, the smaller the value of $\theta s$ (theta scan) the more resolution of where the maximum and minimum points of the diameter (or radius) lie, the better the machine is able to respond to inspection of defective conditions which as grinder marks, groove etc. By the same token, however, use of too small a $\theta s$ value can result in excessive susceptibility to small nicks and marks on the surface, and furthermore, results in commensurately higher data rates required for processing. Such data rates can be relatively high as in a typical gage such as for engine valves where 12 such sensor units were utilized, distributed amongst 3 stations. In this example, data had to be taken from the valve every 10° ($\theta s = 10$ degrees) or 36 processing groups per resolution, from each of the 12 sensors. At 300 msec/rev. This is a combined rate of 1440 pts/sec.

In addition, in this gage it was desired to remove the effects of the fixture from the reading and, therefore, the actual centerline of the valve was calculated from the two end readings such as from detectors 650 and 652 in referenced application Ser. No. 073,266. Such measurement is often required if the part is bouncing due to high speed rotations.

The use of optical gages naturally allows a higher speed of inspection than normally would be possible. For this reason, it is often necessary to take out such bouncing etc. in the computer. When this was fully implemented, it took 3 different microcomputers running in parallel to accomplish the rates of inspection required.

Note that $\theta s$ from one array e.g. 7 of the sensor of FIG. 1 does not necessarily have to be the same as for the second, eg. 8 (on the opposite edge of the part).

It should be noted too that by locating the cylindrical lens close or adjacent to the diode array (as shown in FIG. 1), chromatic distortion produced by simple cylindrical lenses are virtually obviated. In general, the preferred choice is then a short focal length simple cylinder lens located right in front of the diode array, This can ideally be built right in to the array package, serving as the front window thereof.

Ref Ser. No. 203,866 FIG. 6 has illustrated dirt discrimination techniques using matrix arrays. These are generally much wider than linear arrays (eg. 0.250" vs. 0.001" to 0.017") and can be, in certain cases, scanned with all rows electrically connected in unison to simply form a wide linear array. Increased possibilities, however, exist when they are used as matrix arrays, capable of scanning multiple lines.

This averaging process has the further advantage that it provides a measure of resolution enhancement. For example, consider a GE TN2200 128×128 element array, the summation $$D_{Ave} = \frac{\sum\limits_{m}^{n} D_i}{n}$$

where n is the number of lines of elements in the array, in this case, 128, and $D_i$ is the detector element at which the edge image is located, (ie. typically where a voltage threshold is crossed by the edge image).

This averaging can be done in the microcomputer or via a simple circuit and essentially gives 128 lines of data on the edge location, and taking the average, effectively increases the edge definition by removing the ±1 detector digitization, and providing a 128 times improvement, all other things being equal.

Figure 4A:
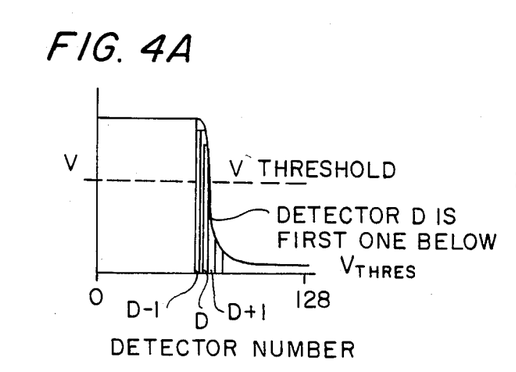
FIG. 4A-D illustrate processing useful for axial scanned images as from matrix arrays.
Figure 4B:
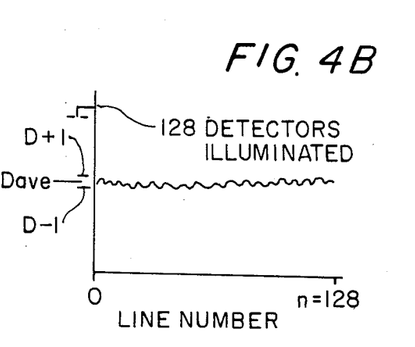

The processing is shown in FIG. 4A. An edge image of the part is formed on a line of detectors. This image shown in 'a' has a sloping gradient which crosses a threshold voltage 'v', generally at either detector D or D+1, (or some other value) depending at least on:
 part roughness and surface condition
 individual detector sensitivity
 dirt on the part or sensor windows
 variation in the light source or lens across the field Accordingly, there is an uncertainty where the edge is at least equal to one part in 128 (or whatever the number of detectors in the scan line is). This uncertainty is manifested in all lines 0–128 in the other direction as shown in FIG. 4B illustrating a plot of image code location detector number versus array line number.

The summation of a multiplicity of such line numbers then gives an averaging of the data and removes this uncertainty.

Figure 4C:
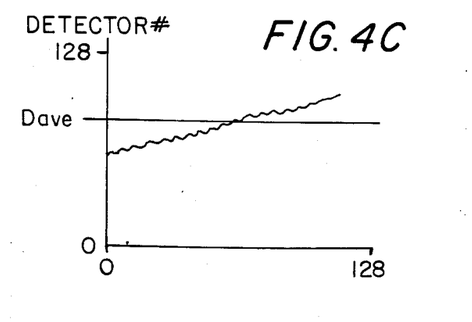

As pointed out in Ser. No. 203,806, and in reference 9, it is also possible to skew the diode array relative to the edge image (FIG. 4C). This assures that even under perfect alignment conditions, resolution enhancement is possible via an averaging process. The average value $D_{ave}$ in this case is generally the same as in that above.

It is noted that the resolution enhancement provided can be further increased using the circuit technique described in the referenced copending applications. In addition, some of the effect of skewing a matrix array can also be analogously provided in a linear array by purposely vibrating the part and taking multiple diameter measurements, each set of measurements involving somewhat different detector elements on the edge image.

Now let us consider the presence of a large dirt bump (protrusion) on the edge, producing a sequence of edge readings such as FIG. 4'd' (also shown in Ser. No. 203,860). This dirt bump could be ignored if the part was rotated using a linear array just as described above (the output trace being similar to that of 4d, but with the horizontal axis representing angle of rotation, 0°–30° or 0–360°, for example.

However, in this example, let us assume no rotation and consider the processing shown on the bump in view at one particular rotational position such as shown in FIG. 6 of Ser. No. 203,866 (which may be the only position if the part is not rotated). In this case, the matrix array is scanned, line by line, and the presence at all linear part edge locations, including the presence of the dirt bump noted. In this case, one has the opportunity to either average over the dirt bump by simply averaging up all the lines, for example, 0–128 on a GE TN2200 128×128 element array, and determing the mean edge location, $D_{ave}$.

Figure 4D:
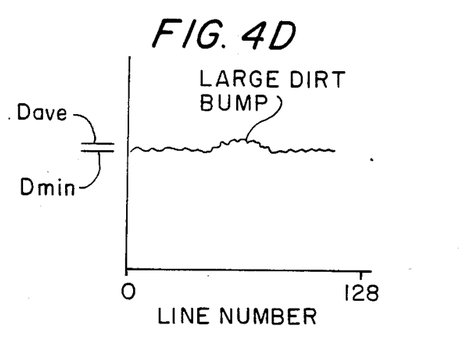

Alternatively, one can simply find the dirt bump and ignore it (via computer program or otherwise, entirely from the data picking only that data which is from flat sections. In FIG. 4d, this means, in effect, considering only lines 0–80 and 100–128.

As a final alternative, and especially where substantial dirt etc. is present on the field of view, one can simply pick the scan line or average of lines having lowest value of diameter, D min, which is, in almost every case, related to the true diameter (except for dips due to grinder flats and the like—a relative rarity). Preferably an average of lines of value Dmin approximately should be taken over a short section, if possible.

It should also be noted that a package can be provided as in FIG. 1 with twin matrix arrays located in a common housing. The principles described above relative to FIG. 4 also have application in fiber optic remoted measurements using bundles, as disclosed in reference Ser. No. 073,226 and other references where the matrix array is used to scan an image of the coherent bundle end containing an image of the part. In this case, fiber bundle irregularities (eg. broken fibers) provide further part image edge discontinuities (such as FIG. 4a illustrates), which can be ignored by a scan of multiple edge locations. Averaging here is highly desirable over multiple scan lines, to take out interstitial fiber effects.

A broken fiber, or a bad array element, creates a constant black or gray point in the field which can be removed using a master part to provide a reference edge image. For example, if matrix array lines 101 and 102 have one or more bad elements (or fibers) in them, these lines can be ignored in all subsequent measurements of test parts. Because bad elements and fibers can cause signals in profile images just like dirt (ie. an increase in diameter), cylinder lenses are useful to average over multiple fibers in the part length direction. This holds true for use with linear arrays as well.

The processing, averaging and light integrating principles described above for profile imaging type measurement can be used as well for diffraction based measurements for example, according to Pryor U.S. Pat. Nos. 3,883,249. The application is basically the same, except that the diffraction pattern rather than image data is used to find the part edge. The diode array integration time and scan rate techniques hold as well.

In this case, it is desirable to use cylindrical or spherical optics to provide a diffraction pattern onto an array which represents at least 0.010"–0.030" of the object surface.

Diffraction measurements are not generally as affected by bad elements or fibers, as the information is redundant (i.e. is carried out by multiple fringes). If one fringe is in a end fiber zone, the other can be used and the bad data thrown out.

The techniques above also work with diffraction images where the image of the part edge is substantially formed using diffracted light. For example, all embodiments above and in the referenced application can be constructed in this manner, as described in FIG. 8.

A further comment on FIG. 4c, illustrating data resulting from use of the canted array. Even though the resolution is being enhanced in this mode, the invention still serves the purpose of averaging out the normal undulations such as surface finish, nicks, scratches etc. on the part since a multitude of measuring points are taken. However, one can also throw out outliers in this mode as well since the array angle to the part is generally known and, therefore, while each reading on the array is different, they are different by uniform amounts, and therefore, the same outlier approach can be utilized in this case as well.

It should be noted that enhancing the resolution with the canted array is particularly useful when the image is extremely sharp (as at low magnifications). In such cases, the edge image is so well defined that there is very little slope for the derivational type circuitry to operate on.

Application of these principles has been primarily applied to sensing of outer diameters of parts. However, measurement of inner diameters, face locations, contours and the like, can also benefit by some of the principles herein disclosed when utilized with triangulation probes such as shown in several referenced copending applications by the inventor and his co-workers. In the particular illustration of FIG. 5 herein, a probe, 400 similar to that shown in a referenced application by the inventor is utilized. As shown, a spot or zone of light 401 is projected onto an inner bore of the part 402 by a diode laser, 410 via a fiber 'pigtail' 411 whose output is focussed onto the part surface by lens 415. Via selfoc or other lens means, 420, light from the surface, viewed through mirror 421 is brought back and focused on array 430. A relay lens 431 is often used as well.

Note that with this arrangement, surface protrusions caused by dirt, etc. cause a decrease in the distance from the sensor. Thus, in this case, significant negative going radius changes are processed out (rather than positive going, as in 'C', pg. 8).

Figure 5A:
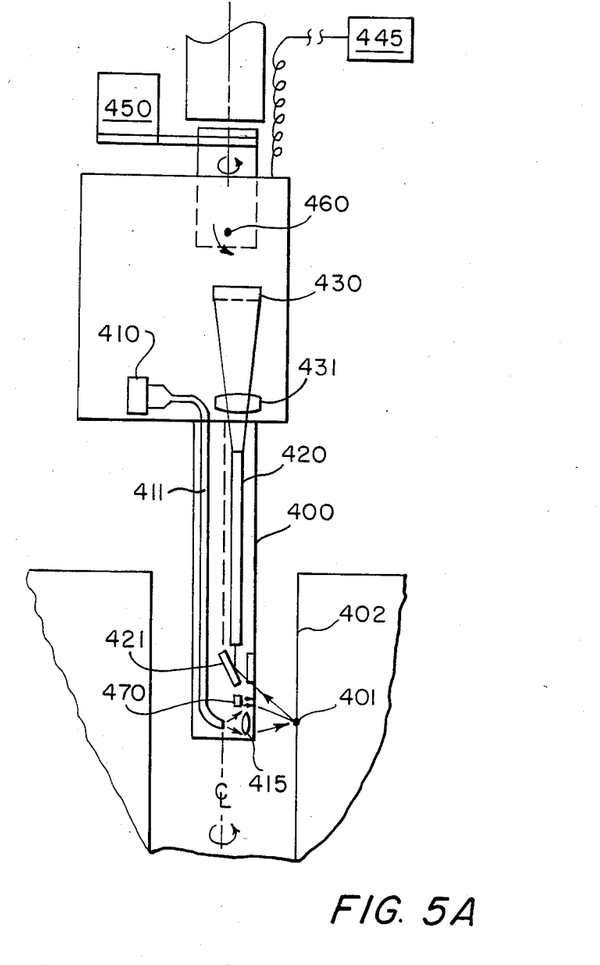
FIGS. 5 and 5B illustrates a rotating triangulation based unit for looking at internal or external surfaces.

In this case, the spot or zone, 401, on the part is in the range of 0.010" to 015" in diameter typically although it can be made smaller for certain purposes, for example in checking turbine blade edge radius.

Therefore, an averaging over 0.010"–0.015" of part surface is accomplished by just simply optically imaging this zone. However, because of reflectance variations of the part even within the spot area, it is desirable when possible to use more data than simply this one zone whose image may be distorted in its amplitude distribution on reflection. This is especially true if the part is dirty.

Figure 5B:
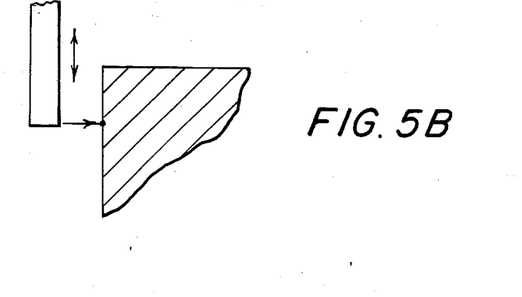

Accordingly, a sweep of the sensor relative to the part surface is made, in this case in the rotational direction, using rotation motor 450. This allows signal processing, via microcomputer 445 or otherwise, over any desired angle of rotation (eg. 10°, 30° etc.) by throwing out outliers, averaging, etc. as disclosed above. This is, of course, extremely desirable in measuring bores which often have wash marks or coolant blobs on them. It also averages out roughness, marks etc. Where no rotation is desirable or available, or where a face 466 is to be measured as in FIG. 5b, then averaging and processing can be done in the vertical (translation) direction, in this case, by simply moving the probe up and down and performing the same type of process.

Let us consider further the construction of the rotary triangulating sensor of FIG. 5. As shown here it is optionally motorized with motor 450 to rotate about the vertical axis providing this allows a 360° sweep of the sensor unit to allow all portions of a part to be inspected. Such rotation is particularly required since the sensor itself senses in only one direction in its usual form rather than in 3 dimensions as 'touch trigger' contact types do. Optionally an additional rotation about a horizontal axis 460 can also be provided for added versatility.

As disclosed in a copending application, there are many useful light sources besides a diode laser with an integral fiber pigtail. Gas lasers producing visible light can also be used and this is an advantage where observation of the spot is desired, however, at far greater cost in package size. As was also described in the copending application, an optional fiber optic remoted or integral white light source 470 can be utilized to illuminate the surface of the part, in which case the edge locations and other surface features, including defects can also be seen by array 430.

In an analogous manner to the translation of probe 400 in FIG. 5B, one can move the profiling linear array sensors of FIGS. 1 and 2 for example down the axis of the part (or the part through the sensor field) and achieve the same averaging etc., without rotation. (Most cylindrical parts are however rotated as a matter of course anyway, and such data analysis can be so performed.) Scans along the axis of the part can be done at high speed with a linear array as now disclosed.

Figures 6A, 6B:
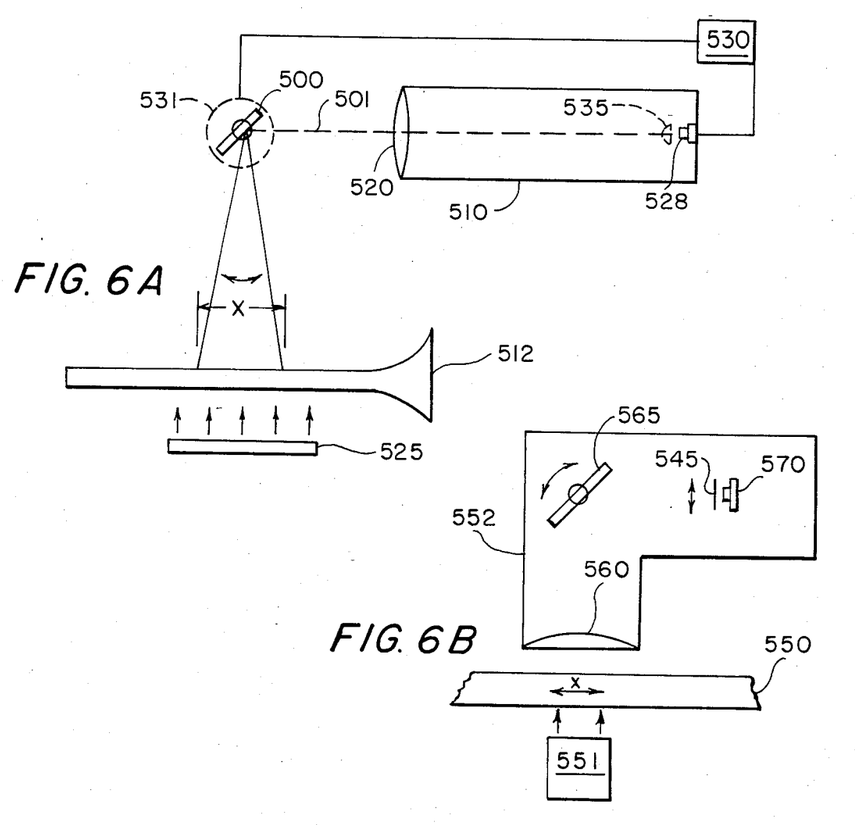
FIGS. 6A-B illustrate method for axial scanning cylindrical parts.

FIG. 6A illustrates an alternative profiling system to the matrix array version of FIG. 4 comprising scan mirrors and linear diode arrays which can be of use in providing axial part scans of long distance, even at high optical magnification in the diametral direction. Particularly interesting for the dirt etc. discrimination purposes of this invention, is that very inexpensive mirror scanners may be used, since the exact position at which measurement is taken axially is not required.

The first example, shown in FIG. 6A, mirror 500 is driven in rotational or oscillating motion by means not shown so as to sweep the axis of view, 501, of sensor 510 over a length 'X' on the surface of part 512. Sensor 510 is comprised at a minimum of lens 520, forming an image of the edge of part 512 illuminated by lamp 525 onto linear diode array 528 (whose line of elements extend out of the paper). In one preferred embodiment, mirror 500 and its rotation means are attached directly to the housing of sensor 510. An optional cylinder lens 535 can also be used to further average each individual reading, requiring less data points to be taken.

The diode array 528 is scanned under control of microcomputer 530 and a plurality of edge data points along X taken. Optionally an encoder 531 or other means of determining mirror position can be used to give the location along X relating to each point, for contour measurements and the like. However, for averaging or disregarding of dirt, etc. this is not required.

FIG. 6B illustrates a second, similar example of a sensor 552 comprising an integral mirror with motor not shown. In this case, however, the image 545 of the edge of object 550 is first formed by lens 560, and said image is then swept by rotational mirror 565 across detector array 570.

It is noted that the requisite mechanical motion required, relative to the part, can also be accomplished by physically translating the sensor 510 (or 552) relative to the part 512 or the part through the field of view of sensor 510. It is further noted that the axis of said linear array can also be skewed relative to the image of said part, as was discussed in FIG. 4, relative to matrix array similar resolution improvement results.

It is also noted that the cylinder optics shown in the figures above, particularly a cylinder lens located near or at the diode array, can also prove of value in the triangulation system shown in FIG. 5. This allows the full spot image width to be compressed onto the array, significantly improving response speed and averaging over more of the part surface. For example, at 3:1 magnification, a spot width of 0.010" on the part surface would result in a 0.030" diameter image on the array. If Reticon G-10 series arrays were used of width 0.010", then 0.020", approximately of the spot would be unusable—unless cylinder optics were used.

A central theme of several embodiments of this invention is that one assumes that the cylindrical surface is essentially straight over the dimension measured. Let us take the first case where the part is well fixtured, is of high tolerance, (such as an engine valve) and is being rotated in a fixture. Except for small undulations due to part bounce, it can be assumed that the part is along a straight line and, therefore, the technique holds. In the presence of more significant bounce, however, certain other effects occur.

If one looks at both edges forming a diameter, one can take out the effects of part bounce, for example, in the versions using two arrays shown in FIG. 1.

In this case, diameter readings stay effectively the same even in the presence of bounce, and variations in diameter due to dirt etc. which are to be ignored can be determined.

Figure 3A:
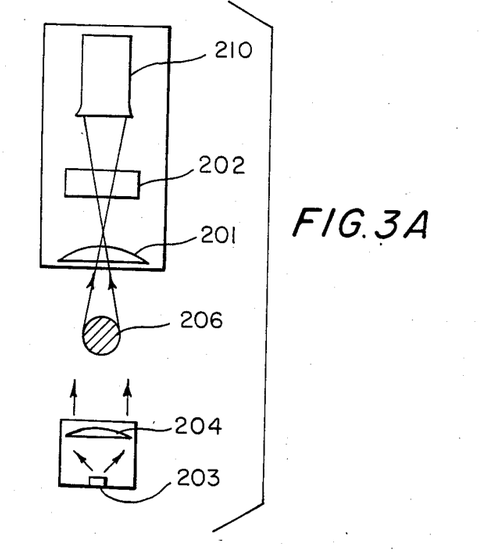
FIGS. 3A-B illustrate alternative cylindrical optical arrangements.
Figure 3B:
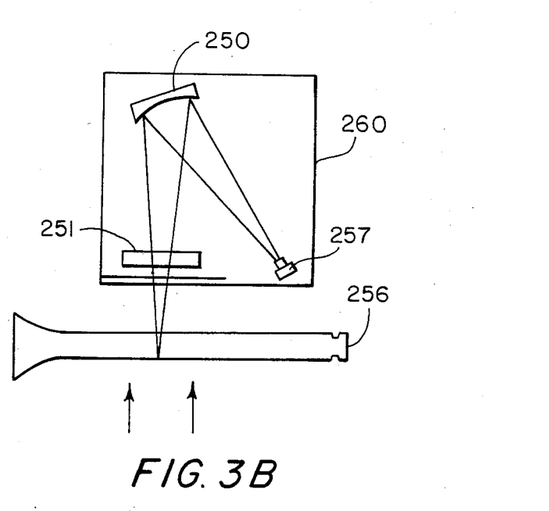

Radial measurement however is another matter. Where bounce is significant, the magnitude of the bounce can be on the order of the size of large dirt or coolant blobs making it difficult from this data alone to discern the difference (except by rate of change). In this case, axial scans as with the matrix or mirror units of FIG. 3 or 6 may be required. The matrix having an advantage in that a pulsed light source may be used, 'freezing' the instantaneous edge locations along the axis and removing entirely the effects of vibration.

In general, it is always best to keep parts as well fixtured as possible to allow the most accuracy and best choice of processing techniques to be employed.

Figure 7A:
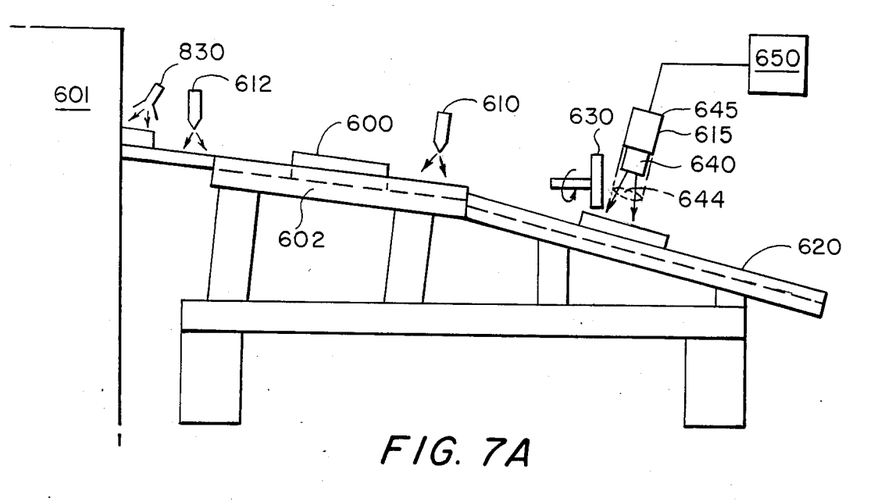
FIGS. 7 and 7B illustrate a method and apparatus for preparing and inspecting parts.

FIG. 7 illustrates another embodiment of the invention showing desirable means of surface preparation of the parts for optical measurements. In this case, cylindrical parts 600 are coming out of a centerless grinder 601 where they are, in general, soaked with coolant and small pieces of grit from the grinder. Three steps of preparation which may be used separately or in combination are here described.

In the first case, the part, as it comes out of the grinder, goes onto a vibrating brush track, 602 such as "Dynaslide", etc. The vibrating brushes are typically arranged to form a Vee track and are inclined in the direction of forward travel of the part tend to push it along as they vibrate as well as provide a rotating and brushing action on the part. This removes the large blobs of coolant and other matter.

An air blow 610 is also utilized as shown to remove residual coolant and this air blow sometimes can be utilized without the benefit of the brush. The air blow also can knock out the dirt particles on the part. Indeed, an optional air blow 612 ahead of the brush can be used to keep large amounts of contaminants off the brushes thereby making their replacement or cleaning less frequent.

As an alternate to the air blows, vacuum can be utilized to as well remove this material.

This air blow can be performed on a short section of track before the part enters the sensor unit 615. This sensor can be located on a track or on a belt. A track 620 is shown herein, while a belt has been shown in the referenced copending application Ser. No. 073,226 FIG. 10 of which this is a continuation.

This technique has been found to be generally quite desirable for cylindrical parts in particular, such as cylindrical roller bearings, wrist pins, and the like. It is further noted that an alternative technique can be used wherein the part is purposely flooded with coolant, oil, or other liquid, either preparatory to this stage as by nozzle 830 or even thereafter. This is particularly useful as a cleaning means. It is particularly useful in electro-optical flaw inspection where the actual thickness of the coolant film is immaterial (see below). It is noted that the brushes here can remove ferrocoat, mineral seal and other very hard to remove substances, as well as detergents that may also be on parts after a washing operation.

In addition, rotating bristle or other specialized type brusing can be utilized rather than the combination of brush and transfer as shown.

In this figure, sensor 615 can be a profile dimensional sensor such as described in the figures above. For example, a dimensional sensor as in FIG. 10 of the referenced case can be used to determine diameter or radial contour as the part passes by on track 620. The axial motion for dirt processing in this case is here provided by the part itself sliding on the track (or powered by a belt or the like) rather than by a sensor scan such as via a matrix array or scan mirror of FIG. 4 or 6.

However, for illustration consider 615 to be a defect detection sensor as in a copending referenced application using a driven roller 630 to advance and rotate the part in vee track 620. Imaging sensor 615 constructed along the principles of the referenced application and containing a lens 644 and diode array 645 looks at axial portions of the part illuminated by light source 640. Data is analyzed by electronics and microcomputer 650, part defects noted, and the part rejected if required.

The apparatus of FIG. 7 for preparing the inspected parts for inspection, is generally capable of removing all but a uniform oil film from the parts. This is of course highly desirable for defect detection as well as dimensional inspection. Indeed, for defect detection, it is generally even more desirable since one must deal with all portions of the surface of the part.

The one advantage of defect detection, however, is that as long as the oil film or other liquid film is uniform, this does not influence the measurement whereas films that are too thick in the dimensional case, cause measurement discrepancies since the measurement is made of the part plus the film thickness.

If the part is prepared in such a way that a uniform, homogeneous oil film with no optical aberations is produced and all the dirt spots are removed from the part, then the inspection equipment, along the lines shown in the referenced co-pending applications will function quite well. However, in certain cases, it is not possible to perform a preparation of this type and in this case, this invention discloses means with which to deal with this situation.

The first technique is to simply ignore large droplet or other blobs on the surface. For example, coming out of a grinder or for that matter a not well maintained washer, one of the obvious problem areas is that a blob of coolant or water is on the part. This is often much more likely than dirt in practical plant application, because the part has just been ground, (or washed), and aside from grinding wheel residue, the coolant has flushed away all the other products leaving a clean, exposed surface free of rust and virtually all significant dirt.

The automatic blob elimination is easily done with circuitry and/or programs such as that disclosed in the pending application (Ref. 3) which is capable under program control, of finding the length and width of various blobs as if they were "true" defects.

Figure 7B:
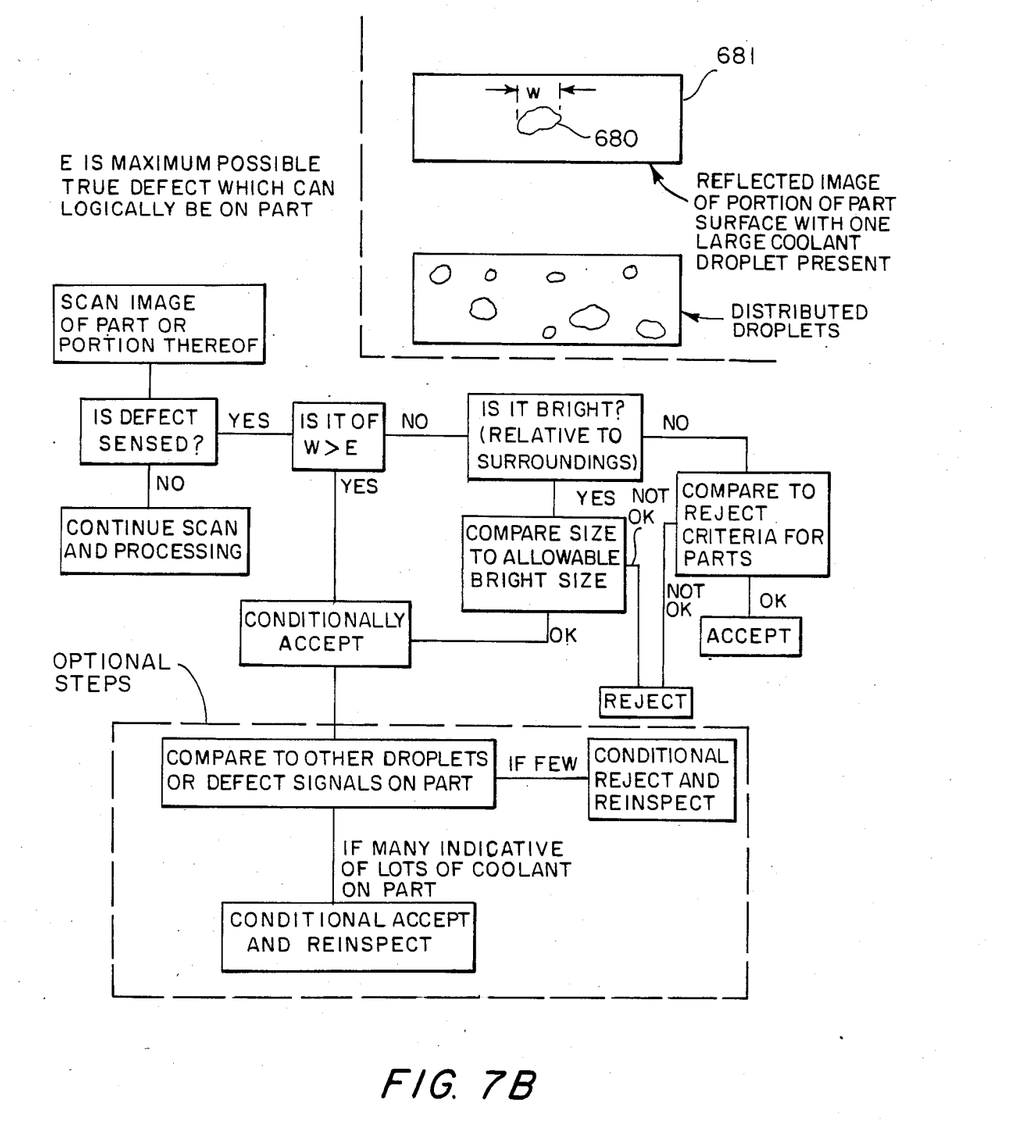

For example, consider herein the program operating as shown in the flow chart of FIG. 7b. The individual measured 'defect' 680 on part 681 is interrogated and found to be a certain width, w. If this particular width is a flaw that is bright, it is known immediately that this is very likely coolant, since no such bright flaw could otherwise exist on a just machined part viewed off the reflectance angle and occupying such a length and breadth. At this point it is simply then disregarded in the program analysis of the part. Even large dark 'flaws' can be so discarded, if one historically does not expect too much large porosity or other defects on the parts. Another possibility is to look for large amounts of distributed blobs—indicative of a bad wash or preparation.

If the part has gone through a brushing station and a dark 'flaw' generally long and linear is seen, this can also discarded as being likely a bristle or another part of the cleaning system.

Let us now consider FIG. 8 in illustrating the use of a diffractive type image formation according to this invention. In this example, the image is formed using light diffracted from the object rather than light transmitted past the object. To accomplish this, a stop is typically placed in the field blocking all directly transmitted light as shown in FIG. 8.

If coherent light is utilized and no other light but diffracted light is present, the typical image can be formed which has a dark line in its middle. This dark line is extremely good for metrological purposes and has been described in papers by Dew (Optica Acta 1970 Vol 17 #4, pages 237-257), Lansraux and others. Utilization of the diode array, according to this invention, can be used for detecting of this dark line location and similar comments relative to the averaging, filtering, etc. of dirt etc. that have been described here can be so utilized therewith. Indeed, so can all those concepts related in the applicable co-pending referenced applications.

While filtered images can be made of all sorts of contoured edges, such as screws threads, most practical examples of this technique relate to cylindrical parts or quasi-straight sections of curved parts. In this case, a grazing reflection wave is generated at the surface of the part which tends to overwhelm all diffraction waves and furthermore provide out of phase information which causes the dark line to be overcome. Since this reflection wave is bothersome, it is desirable, in most cases, to block it entirely and utilize light coming only from the diffraction wave on the shadow side of the cylindrical object as shown in FIG. 8. In this case, the object 800 is illuminated by diode laser 801 collimated by lens 802 and the image 835 formed by lens 806. This image 835 is a spot with a dark center line 836 with intensity profile as shown. The location of this line is detected using photo detector array 840, and is proportional to the location of the object edge 804.

As taught in the Dew reference, for the larger radius objects most found in practice, objects must have N less than 3 for the mask 812 to block most of the grazing reflection wave. Indeed, in some cases, it is desirable to provide a complete block of the wave as with mask 813 (dotted lines).

In this case, the image contains no central minimum, but is instead a spot 880 (FIG. 8'). Spot position can be detected by first derivative or centroid means shown in referenced copending applications concerning triangulation measurement. Blocking all light at positive insures that only diffracted radiation is used. However, where possible, it is desirable to use null point 836 which can be optionally detected by diode array 840.

As before, it is desirable to use a cylinder lens if required to look at a substantial distance if possible along the length of a cylindrical object. All other processing discussed relative to previous figures can be applied as well.

This embodiment besides illustrating the usefulness of diffractive illumination also illustrates an application to the ignoring of dirt and other defects using the scatter from such dirt etc. coming off the surface of the part. In this case, a separate dirt etc. detection sensor 830 is located above the part. When it senses light scatter due to dirt or other irregularities on the part, it causes controller 839 to provide an inhibit signal to stop the reading from the diode array 840. This same detect scatter and inhibit technique can of course be used with the other imaging and triangulating systems shown in previous embodiments.

The diffractive image formation optics system above requires the use of a laser light source for maximum effectiveness, since a strong diffraction wave is required for good detection speed.

While not as precise as when a interference line can be generated, a principle advantage that it has over the normal imaging utilized in FIG. 1 of this application for example, is that it allows use to view the centroid of radiation as the edge location rather than some possibly arbitrary edge image.

One of these is where considerable depth of field is required. While the spot goes in and out of focus, its centroid is effectively constant.

A second reason, which isn't so obvious, is that we have indeed filtered out the reflection wave which can be a problem in certain other imaging situations. Naturally, a transmissive image can be also formed, but this leads to very sloped sided images. In this case, the sloping image definition is not so serious since one is looking for a centroid not a relatively imaginary point such as the imaged slope in a tall centric system with the non-parallel light blocked. Certain other aspects of centroid detection can be useful when the image is degraded as in going through a fiber bundle as shown in the first co-pending referenced application.

It is noted that all of the above embodiments have emphasized the use of photo detector arrays to perform the measurement. Other suitable detectors, while less preferred, can however be used, such as TV cameras or a position sensor analog photo detector such as a UDT SC-10 shown as 890 in FIG. 8' (dotted lines). "Light" in this disclosure is understood to include all electro-magnetic wavelengths UV through IR. Visible and near IR wavelengths are however preferred.

As has been pointed out above, and in ref. Ser. No. 073,226, coherent fiber optics can be used to transport the image (or diffraction pattern) of either an object edge or spot on an object surface. In this case, cylindrical optics are often valuable for compressing the image of a zone of the part surface onto the fiber end and/or at the receiving end for compressing a subsequent image of the other end onto a photodetector array.

For example, lens 614 in case Ser. No. 073,226 could be a cylinder lens provided for this purpose.

The following are some additional comments relative to construction of sensors shown in FIG. 1. The 'Flat Pack' design is typically 0.7" high (h). First it is noted that such a housing is extremely desirable to allow the sensors to be packed together when measuring shafts etc. This was pointed out in Ser. No. 073,226. Also, both dual packages as shown in FIG. 1 for diameter measurements can be provided, or single packages as shown.

The construction of such package can have the lens(es) on a diode array (5) mounted to a common plate such as 10, with a cover, 11, fastened to said plate and typically of U section. Alternatively, as shown in FIG. 1B, the lens(es) and photodetector array(s) can be mounted to plates such as front plate 110 affixed to a channel (or box) section (extrusion or casting) 111.

If a channel section is used as shown, a flat cover plate 115 is utilized. This is desirably removeable not only for service, but for initial setup when it is desirable to see the image of the part on the photodetector array.

Also shown in the front view of FIG. 1B are lenses 15 and 16 mounted to front plate 110 and optionally covered by window 22. These lenses are typically spherical achromats but with their top and bottom portions cut off to fit within the narrow confines 'h'. While special lenses can be made to fit, this procedure is quite satisfactory. The same procedure holds for auxiliary lenses 18 and 19. For example, a 1 inch diameter spherical lens commonly used in practice requires a reduction in diameter in the direction of 'h' of at least 0.4" to fit in a h=0.75" housing. It is noted that use of cut down large diameter spherical lenses provide a bigger light gathering aperture and, bigger range of part diameter, than if smaller round lenses are utilized.

Potted integrated circuit diode array drive modules 130 and 135 are typically incorporated to provide onboard array scanning and conversion to sample and held detector voltage amplitudes capable of long distance transmission over ordinary cabelling.

It is noted that the two adjacent 'Flat Packs', 1 and 101, shown in FIG. 1 can be joined together as with connection plate 102, to form a common sensor. Indeed a common base plate, such as 10, can be used to mount, on opposite sides, the lenses and arrays of both package 1 and 101.

As pointed out in FIG. 3, lenses 15-16 can be cylindrical lenses as well with the uncurved axes in the 'h' direction and cut to size to fit the height limit 'h'.

In one preferred embodiment cover 115 can slide forward (toward part 2) to at least position 'A', to allow one to see the image and edge of part 2 being scanned by array(s) 5 and/or 6. This capability is very important for set-up. For this reason, and the desirability of nesting the flat packs in the close adjacency (as 1 and 101) to measure closely spaced diameters on shafts, it is preferred to place the mounting points (typically threaded holes) for the housing, 145 and 146, on the narrow side. Alternatively, mounting on the bottom plate 10, or large bottom face of channel 111 may be provided, as can other arrangements.

For small part diameters, requiring a minimal lens axis spacing, D*nominal, it is convenient to keep the same package as FIG. 1, and use prism or mirror optics to move the effective center lines closer together. This is shown as 150 and 151 (dotted lines) resulting in an effective center to center spacing of D*nominal.

A suitable prism for this purpose is a Rhomboid prism. Note that if we consider the housing 1, to be two single array housings, separated along centerline C, then the use of such prisms allows one to check parts from any diameter to which each housing can be moved all the way down to Dnom, or even Dnom* if the prism attachments are used.

It is considered within the scope of the invention to have each of such single packages located on a movable mount, which can vary the spacing Dnom or Dnom* by use of a differential screw or by actuating either or both housings, independently. This allows construction of simple, versatile non-contact inspection devices usable on a wide range of diameters. One such unit for example could be adjusted from Dnom* of 0.5 inches all the way to 8".

Typical scan rates of diode arrays used in this invention range from 10/sec all the way to several thousand/sec. Generally, however, the slower the rate, the less light and less cost involved.

Where pulsed light sources are used, for example to freeze part motion, typical pulse lengths are 20-50 micro seconds for Xenon flash, 1-50 microseconds for pulsed LEDs, and 100-200 microseconds for pulsed diodes lasers. Continuous light sources, however, are required to achieve surface integration during a mechanical part translation or rotation, for example over rotation, $\theta$s (FIG. 2). Pulsed sources are desirably used with the matrix array of FIG. 4.

What is claimed is:

1. A method for sensing the location of a surface of an object in the presence of localized surface contamination, roughness or other minor irregularities, said method comprising:

providing imaging of a light image or pattern on a photodetector corresponding to a point or zone on the surface of an object illuminated with light so that said photodetector produces an electrical output signal related to the relative location of the point or zone;

carrying out the foregoing step with respect to a plurality of points or zones on the surface of the object sequentially in time so as to generate a plurality of corresponding electrical signals;

averaging values represented by the electrical signals produced by said photodetector corresponding to said plurality of points or zones on the surface so as to substantially eliminate errors related to local contamination, roughness or other minor irregularities;

and determining the location of the surface of the object using the averaged values.

2. A method as claimed in claim 1 including the step of projecting the light image or pattern through cylindrical optics.

3. A method as claimed in claim 1 wherein the cylindrical optics includes a cylinder lens and said cylinder lens is located in close proximity to the photodetector.

4. A method as claimed in claim 1 wherein carrying out of said step with respect to a plurality of points or zones includes the step of moving the surface relative to the photodetector.

5. A method as claimed in claim 1 wherein carrying out of said step with respect to a plurality of points or zones includes scanning the image or pattern representing the location of the object.

6. A metod as claimed in claim 5 wherein the scanning is accomplished using a two dimensional scanning photodetector.

7. A method as claimed in claim 5 wherein the scanning is accomplished by moving the image or pattern of the object.

8. A method as claimed in claim 1 including sensing protrusions on said surface at points along the surface and ignoring the values represented by the electrical signals corresponding to these protrusions in averaging the values representing the electrical signals.

9. A method as claimed in claim 8 wherein only signals representative of values greater a preset limit related to the average values of said signals are ignored.

10. A method as claimed in claims 4 or 6 wherein the surface is a portion of an outer surface of a cylindrical object, and carrying out of said step with respect to a plurality of points or zones comprises rotating of the cylindrical object about the longitudinal axis of the cylindrical object so as to provide a plurality of electrical signals related to the locations of a plurality of points or zones on the surface of the object.

11. A method as claimed in claim 1 wherein the surface of the object is rotated and electrical signals are provided for zones covering at least 5° of the surface of the object.

12. A method as claimed in claim 1 further comprising ignoring electrical signals having values above a preset limit or values below a preset limit.

13. A method as claimed in claim 1 wherein said averaging step includes averaging the values of all of said signals, ignoring values above or below a preset limit relative to the average value of all of said signals and re-averaging the values of the remaining signals.

14. A method as claimed in claim 1 wherein imaging of a light image.or pattern on said photodetector includes a step of transmitting the image or pattern to the photodetector using a coherent fiber optic device.

15. A method as claimed in claim 1 wherein said averaging step includes averaging only the values of electrical signals having substantially the same magnitude.

16. A method as claimed in claim 1 and further including sensing light scatter or another characteristic of surface contamination during the imaging a said light image or pattern on said photodetector, and ignoring any optical images or patterns when surface contamination is sensed.

17. A method for improving the sensing resolution with respect to the position of an edge of an object using a photodetector array which is serially scanned, said method comprising the steps of:
illuminating an edge of the object;
forming an image or pattern on the photodetector array corresponding to a plurality of substantially adjacent portions of the edge of the object; and
averaging the output signals produced by said photodetector array corresponding to said images or patterns formed thereon and using the resultant average to obtain an average position for the object edge whose resolution is increased beyond that obtainable with the array by itself during a single scan.

18. A method as claimed in claim 17 wherein the photodetector array is a matrix array and further including the step of scanning the lines of the matrix array sequentially during the scanning step.

19. A method as claimed in claim 17 wherein said photodetector array is a linear array and wherein forming further images or patterns on the photodetector array at a plurality of substantially adjacent locations is performed by moving the object.

20. A method as claimed in claim 17 and further including the step of skewing the axis of the photodetector array relative to the image or pattern of the edge of the object.

21. A method as claimed in claim 17 wherein the number of the detector array element whose output signal crosses a voltage threshold value corresponding to the object edge location is stored.

22. A method as claimed in claim 17 wherein the forming of the image or pattern includes a step of transmitting the image or pattern to the photodetector array by a fiber optic device.

23. A method for electro-optically inspecting objects which have surface contamination, said method comprising the steps of:
initially cleaning the object to remove the contamination from the object surface;
sensing the surface electro-optically at a plurality of points to produce corresponding output data;
averaging the output data for said plurality of points to substantially eliminate the effects of any residual contamination; and
utilizing the averaged data in inspection of the object.

24. A method as claimed in claim 23 wherein data which is indicative of residual surface contamination or surface irregularity is ignored in carrying out the averaging step.

25. A method as claimed in claim 24 wherein contamination on the object surface is sensed using a further sensor.

26. A method as claimed in claim 23 wherein the cleaning step includes the moving of air over the surface of the object.

27. A method as claimed in claim 23 wherein said cleaning step includes the brushing of the surface of the object.

28. A method as claimed in claim 27 wherein the brushing step also moves the object.

29. An apparatus for electro-optically determining the position of a surface of an object in the presence of localized surface contamination, roughness, or other minor irregularities, said apparatus comprising:
a light source for illuminating the surface of the object;
a photodetector means for detecting a light image or pattern for a plurality of points on the surface of the object illuminated by light from said light source and for producing a plurality of output signals in accordance therewith;

means for averaging values represented by said electrical signals to substantially eliminate errors due to localized contamination and other irregularities; and means connected to said averaging means for using the results produced by the averaging means to determine the position of the surface.

30. Apparatus as claimed in claim 29 wherein said photodetector means includes a wide diode array and a low magnification lens means for imaging the plurality of points on the surface onto the photodetector means.

31. Apparatus as claimed in claim 29 wherein said photodetector means includes a narrow diode array and cylinder lens optic means for imaging the plurality of points on the surface onto the photodetector means.

32. Apparatus as claimed in claim 29 wherein said photodetector means includes a linear diode array and a scanning mirror means.

33. Apparatus as claimed in claim 32 wherein said photodetector means also includes a cylinder lens.

34. Apparatus as claimed in claims 29, 30, 31 or 32 further comprising means for moving said object and said photodetector means relative to the other such that the plurality of points on the surface are detected by the photodetector means.

35. Apparatus as claimed in claim 29 wherein said light source comprises a long and diffuse light source.

36. Apparatus as claimed in claim 29 wherein said light source comprises a quasi-parallel light source.

37. Apparatus as claimed in claim 29 wherein said light source comprises a pulsed light source.

38. Apparatus as claimed in claim 29 and further including a sensor means for sensing light scattered from irregularities on the surface at the plurality of points and means for terminating the operation of said averaging means when said sensor means senses an irregularity.

39. Apparatus as claimed in claim 29 wherein a dimension is determined corresponding to the distance between said surface and a further surface; and wherein said apparatus includes a second photodetector means, mounted in spaced relation with respect to the first mentioned photodetector means, for detecting a light image or pattern for a plurality of points on said further surface and for producing a plurality of output signals in accordance therewith; and said averaging means includes means for averaging values represented by said electrical signals produced by said second photodetector means for said plurality of points on said further surface to substantially eliminate errors due to localized contamination and other irregularities.

40. Apparatus as claimed in claim 39 and further including means for adjusting the spacing between the first mentioned photodetector means and said second photodetector means.

41. A sensing apparatus as claimed in claim 39 and further including means for optically shifting the viewing axes of the first mentioned photodetector means and said second photodetector means.

42. A sensing apparatus as claimed in claim 29 wherein said photodetector means includes a remotely located photodetector and a fiber optic means for transmitting the image or pattern from the object to said photodetector.

43. A sensing apparatus as claimed in claim 29 wherein said photodetector means includes a spherical achromatic lens having the top and bottom portions thereof cut off.

44. A method for sensing the location of a surface of an object in the presence of localized surface contamination, roughness or other minor irregularities, said method comprising:

providing imaging of a light image or pattern on a photodetector corresponding to a point or zone on the surface of the object illuminated with light such that the photodetector produces an electrical output signal related to the relative location of said point or zone;

carrying out the foregoing step with respect to a plurality of points or zones on the surface of the object to generate a plurality of electrical signals;

comparing values represented by said electrical signals with a predetermined threshold;

eliminating substantially all of the electrical signals having values falling outside of the predetermined threshold;

and determining the location of the surface of the object based on the values represented by the electrical signals remaining after the electrical signals having values falling outside of said predetermined threshold are eliminated.

45. A method as claimed in claim 44 wherein the values represented by said electrical signals are averaged prior to said eliminating step and said predetermined threshold is determined relative to the average of said electrical signals.

46. A method as claimed in claim 44 wherein the values represented by said electrical signals are averaged after said elimination step and the average value is then used in determining the location of the surface of the object.

47. A method as claimed in claim 44 wherein values represented by electrical signals greater than a predetermined threshold are eliminated.

48. A method as claimed in claim 44 wherein values represented by the electrical signals which are greater than a predetermined threshold or less than a further predetermined threshold are eliminated.

49. A method for determining the location of a surface of an object in the presence of localized surface contamination, roughness or other minor irregularities, said method comprising:

providing imaging of a light image or pattern on a photodetector indicative of the location of a point or zone on the surface of an object illuminated from a light source;

carrying out the foregoing step with respect to a plurality of points or zones on the surface of the object;

providing integration of the output produced by the photodetector for the plurality of points or zones to provide averaging of said output with respect to time so as to substantially eliminate errors related to local contamination or other irregularities;

and using the integrated output produced by the photodetector in determining the location of the surface of the object.

50. A method as claimed in claim 49 wherein relative movement is provided between the light source and the surface of the object to provide scanning of the surface and imaging of a plurality of points or zones on said photodetector.

51. A method as claimed in claim 49 wherein said photodetector comprises a scanning photodetector array and the output produced by said photodetector array is integrated by scanning the array at a slow scan rate which provides integration of the outputs of the individual photodetectors making up the array.

52. A method as claimed in claim 49 wherein said photodetector comprises a scanning photodetector array and wherein cyclic relative movement is provided between the light source and the surface of the object, said integration of the output of the photodetector being provided by integrating the light energy detected by said array over a predetemined interval of the relative movement between the light source and the object.

53. A method as claimed in claim 49 wherein said photodetector comprises a scanning photodetector array and the scanning rate of said photodetector array is chosen so that a plurality of points or zones on the array are represented by each scan of the array.

54. A method for sensing the location of a surface of an object, said surface having present thereon localized surface contamination or the like, and said method comprising:

illuminating the surface over a zone of a predetermined length;

detecting a light image or pattern corresponding to said length, using a photodetector to produce an output in a manner so as to provide averaging of light energy received simultaneously from a plurality of points along said length to thereby substantially eliminate errors due to the localized surface contamination;

and utilizing the output of said photodetector in determining the location of the surface of the object.

55. A method as claimed in claim 54 wherein a cylinder lens is used to focus light from said zone onto said photodetector and the width of said photodetector is relatively narrow.

56. A method as claimed in claim 54 wherein a photodetector of large width is used to detect the light energy from said zone and the magnification provided of the light is relatively low.

57. A method for sensing the location of a surface of an object in the presence of localized surface contamination, roughness or minor irregularities, said method comprising:

providing imaging of a light image or pattern on an electro-optical sensor corresponding to a point or zone on the surface of an object illuminated with light so that said electro-optical sensor produces an electrical output signal related to the relative location of the point or zone;

sensing light scatter or another optical characteristic of surface contamination occuring during imaging of said light image or pattern onto said electro-optical sensor and ignoring substantially all of the optical images or patterns corresponding to a said characteristic of surface contamination; and determining the location of the surface of the object based on the electrical signals produced by said electro-optical sensor exclusive of those corresponding to a said characteristic of surface contamination.

58. An apparatus for sensing the location of a surface of an object in the presence of localized surface contamination, roughness or other minor irregularities, said method comprising:

an electro-optical sensor;

means for providing imaging of a light image or pattern on said electro-optical sensor corresponding to a point or zone on the surface of an object illuminated with light so that said electro-optical sensor produces an electrical output signal related to the relative location of the point or zone;

means for sensing light scatter or another optical characteristic of surface contamination occuring during imaging of said light image or pattern onto said electro-optical sensor and for eliminating substantially all of the optical images or patterns corresponding to a said characteristic of surface contamination; and means for determining the location of the surface of the object based on said electrical signals produced by said electro-optical sensor exclusive of those electrical signals corresponding to a said characteristic of surface contamination.

59. A method for sensing the location of a surface of an object in the presence of localized surface contamination, roughness or ther minor irregularities, said method comprising:

providing imaging of a light image or pattern on an electro-optical sensor corresponding to a point or zone on the surface of an object illuminated with light so that said electro-optical sensor produces an electrical output signal related to the relative location of the point or zone;

sensing any protrusions on said surface at points along said surface and ignoring substantially all signals corresponding to any protrusions sensed on the surface; and determining the location of said surface of said object using said electrical signals produced by said electro-optical signal exclusive of those signals corresponding to protrusions on said surface.

60. A methed as claimed in claim 59 wherein said protrusions are sensed by comparing the electrical signals produced by said electro-optical sensor with a predetermined threshold and wherein substantially all signals greater than said predetermined threshold are ignored.

61. An apparatus for sensing the location of a surface of an object in the presence of localized surface contamination, roughness or other minor irregularities, said apparatus comprising:

an electro-optical sensor for producing an electrical output signal in accordance with the light sensed thereby;

means for providing imaging of a light image or pattern on said electro-optical sensor corresponding to a point or zone on the surface illuminated with light so that said electro-optical sensor produces an electrical output signal related to the relative location of the point or zone;

means for sensing any protrusions on said surface at points along said surface and for eliminating substantially all of said electrical signals corresponding to any protrusions sensed on the surface; and determining the location of said surface of the object using electrical signals produced by said electro-optical sensor exclusive of those signals which correspond to any protrusions sensed on the surface.

62. An apparatus as claimed in claim 61 wherein said sensing means comprises comparing means for comparing the electrical signals produced by said electro-optical sensor with a predetermined threshold and for eliminating substantially all signals greater than said threshold.

* * * * *